United States Patent [19]

Kubota

[11] 4,014,299
[45] Mar. 29, 1977

[54] METHOD AND DEVICE FOR RESTRAINING NITROGEN OXIDE PRODUCTION IN COMBUSTION GAS OF INTERNAL COMBUSTION ENGINES

[76] Inventor: Hidetsugu Kubota, No. 4-9, 3-chome, Motomachi, Kameda, Naka Kanbara, Niigata, Japan

[22] Filed: Jan. 20, 1976

[21] Appl. No.: 650,671

[30] Foreign Application Priority Data

Jan. 23, 1975  Japan ................... 50-10304

[52] U.S. Cl. ............................................ 123/25 P
[51] Int. Cl.² ................. F02D 18/00; F02D 47/00
[58] Field of Search .......... 123/25 B, 25 DP, 25 R, 123/25 H, 25 M, 25 N, 2 SC; 261/18 A

[56] References Cited
UNITED STATES PATENTS

| | | | |
|---|---|---|---|
| 1,068,414 | 7/1913 | Courtenay | 123/25 P |
| 1,274,233 | 7/1918 | Bellion | 123/25 B |
| 1,509,426 | 9/1924 | Gregg, Jr. | 123/25 B |
| 2,671,311 | 3/1954 | Rohrbach | 123/250 X |
| 2,862,482 | 12/1958 | Hart | 123/25 P X |
| 2,919,540 | 1/1960 | Percival | 123/25 P X |
| 3,552,364 | 1/1971 | Short | 123/25 P |
| 3,665,897 | 5/1972 | Boyer | 123/25 N X |

Primary Examiner—C. J. Husar
Assistant Examiner—Ira S. Lazarus
Attorney, Agent, or Firm—Henry R. Lerner

[57] ABSTRACT

Method and device for restraining nitrogen oxide production in combustion gas of internal combustion engines, comprising feeding a suitable quantity of steam into cylinder of internal combustion engine and mixing the steam in fuel-air mixture.

3 Claims, 4 Drawing Figures

METHOD AND DEVICE FOR RESTRAINING NITROGEN OXIDE PRODUCTION IN COMBUSTION GAS OF INTERNAL COMBUSTION ENGINES

Generally, nitrogen oxides are assumed to occur due to unnecessary combustion heat rise resulting from high pressure for explosive combustion in the interior of the cylinders of fuel engines.

In the present invention, in order to control high temperature, steam is mixed into the fuel-air mixture.

If mixing quantities are not correct, combustion is incomplete and, if correct, nitrogen oxides scarcely occur.

Consequently, in the present invention, the correct quantity of water is fed to steam evaporating means opening at the most compressed portion of the cylinder so that the water pressure is regulated. Means for maintaining the correct quantity of water is set or automatically operated.

Now the present invention will be explained with respect to an embodiment shown in the drawings, in which.

Figure 1:
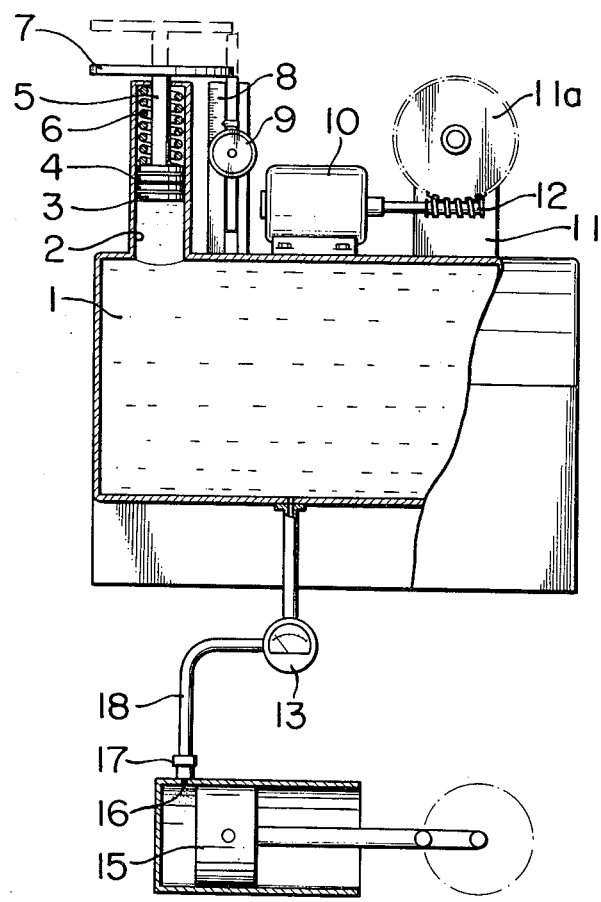
FIG. 1 shows the embodiment of the present invention.
Figure 2:
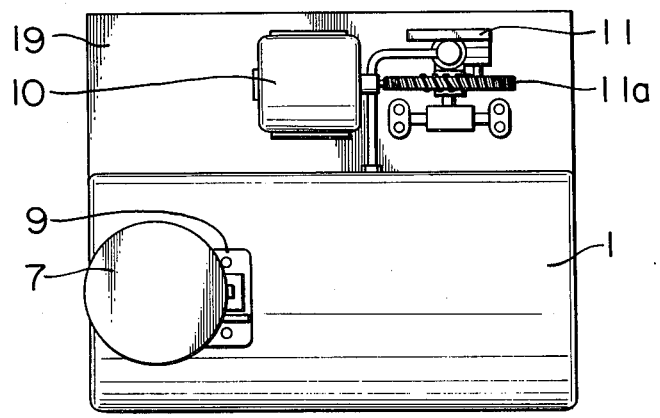
FIG. 2 shows a plan view.
Figure 3:
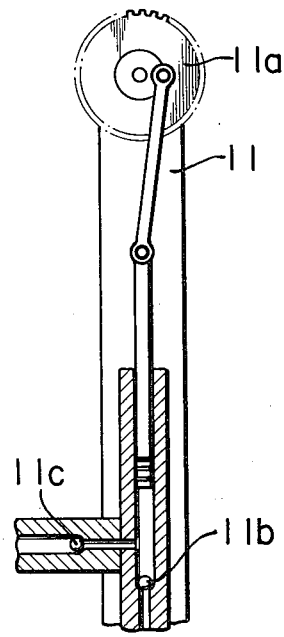
FIG. 3 shows a high pressure pump means for pumping small quantities.
Figure 4:
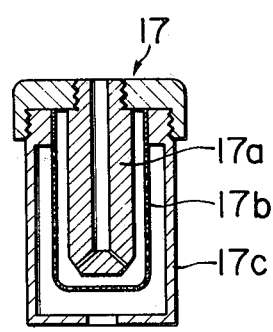
FIG. 4 shows an evaporating means with a nozzle.

Referring to the drawings, 1 is a water pressure regulating tank, 2 a water pressure regulating cylinder, 3 a piston in the water pressure regulating cylinder, 4 piston rings, 5 a vertical rod fixed to the piston, 6 a spring for regulating water pressure, 7 a disc for connecting an electric source, 8 a scale for water pressure, 9 a knob for fastening the water pressure regulating vertical rod, 10 a motor, 11 a fine quantity pump, 11a a gear wheel of the pump, 12 a worm connected to the motor, 13 a pressure meter, 14 the exterior of a cylinder, 15 a piston, 16 a steam injection portion in the cylinder, 17 a water evaporation means, 17a a nozzle body, 17b a multiperforation cylinder for producing steam, 17c a cylinder with an outer wall, 18 a water supply pipe and 19 a bed mounted by mechanical means.

Operation of the device will be explained as follows:

As mentioned the previous paragraph, ignition explosion is carried out when the fuel-air mixture is compressed in a gaseous state in the cylinder of engine, namely, immediately before the piston reaches the dead point. The instantaneous temperature amounts to over 2000° C. Molecules combine to form various nitrogen oxides. There are two ways to prevent nitrogen dioxide production. The ignition may be carried out when piston reaches the dead point of compression. This method can avoid high compression due to ignition time lag, but results in unuseful combustion and large loss in output. On the other hand, according to the invention, steam is mixed with the fuel-air mixture when the fuel-air mixture is sucked into the cylinder upon the starting of a four cycle engine. The position of ignition is defined as being about 50°. Then, the water supply to the steam producing portion of the system is stopped by the pressure resulting from the combustion caused by the ignition. Then, at the middle of the exhausting, water supply is commenced automatically and, by suction, steam is mixed with the fuel-air mixture. Ignition combustion is complete, extraordinary rise of heat is prevented and the output is good due to steam differing from water spray.

In order to obtain a completely correct supply of steam, tests at progressively increasing water pressures are carried out. The water pressure regulating vertical rod 9 is set according to the scale and fixed at a desired position by means of the knob. If the water pressure rises above the thusly fixed water pressure, the supply of electricity to the motor is cut off to automatically stop the motor. If the water pressure is lowered by the water supply, the vertical rod 5 attached to the piston is lowered to be connected to the source of electricity and operate the motor. Thus, a good steam supply to the cylinders of the internal combustion engine is automatically effected.

I claim:

1. In combination with at least one cylinder of an internal combustion engine, an apparatus for substantially preventing the formation of nitrogen oxides when a mixture of fuel and air is combusted in the cylinder, the apparatus comprising a tank for containing water, water evaporating and ejecting means communicating with the interior of the cylinder below the dead bottom position of the piston in the cylinder for injecting steam into the cylinder, a conduit communicating between the tank and the evaporating and ejecting means for providing water to the evaporating and ejecting means for conversion to steam and injection into the cylinder and means for regulating the water pressure in the tank in a range so related to the pressures developed in the cylinder of the engine that simultaneously with the drawing into the cylinder of the mixture of fuel and air, steam is injected into the cylinder and mixes with the mixture of fuel and air, then the injection of steam into the cylinder ceases due to the increased pressure produced in the cylinder by the combustion of the mixture and, to complete the cycle, steam is again injected into the cylinder beginning during the exhaust stroke and continuing during the intake of the fuel and air mixture due to the lower pressure in the cylinder during these stages.

2. An apparatus according to claim 1, in which the pressure regulating means includes a pump communicating with the interior of the tank for pressurizing water in the tank, an electric motor, means for transmitting the output of the electric motor to the pump for driving the pump, means for actuating and deactuating the electric motor, a pressure regulating cylinder communicating with the interior of the tank, a pressure regulating piston received in the pressure regulating cylinder for reciprocation therein and means operatively connecting the pressure regulating piston to the means for actuating and deactuating the electric motor to actuate the electric motor when the pressure regulating piston reaches a predetermined lower level in the pressure regulating cylinder and to deactuate the electric motor when the pressure regulating piston reaches a predetermined upper level in the pressure regulating cylinder.

3. A method for substantially preventing the formation of nitrogen oxides when a mixture of fuel and air is combusted in a cylinder of an internal combustion engine, comprising feeding water from a supply thereof to means for converting the water to steam, simultaneously with the conversion of the water to steam, injecting the steam into the cylinder below the dead bottom position of the piston in the cylinder and regulating the pressure of the water supply in a range so related to the pressures developed in the cylinder that simultaneously with the drawing into the cylinder of the mixture of fuel and air, steam is injected into the cylinder and mixes with the mixture of fuel and air, then the injection of steam into the cylinder ceases due to the increased pressure produced in the cylinder by the combustion of the mixture and, to complete the cycle, steam is again injected into the cylinder beginning during the exhaust stroke and continuing during the intake of the fuel and air mixture due to the lower pressure in the cylinder during these stages.

* * * * *